G. N. & G. Munger,
School Slate,
№ 26,916.  Patented Jan. 24, 1860.
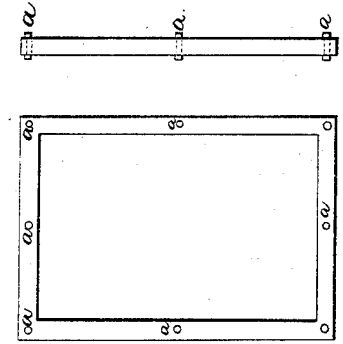
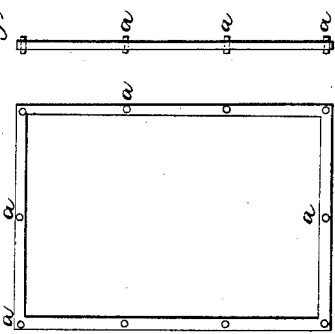
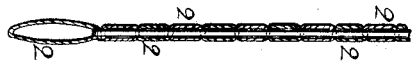
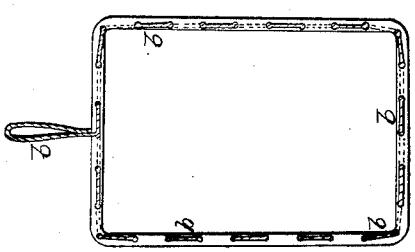
Witnesses:
Inventors;
Geo. N. Munger
George Munger

UNITED STATES PATENT OFFICE.

GEORGE N. MUNGER AND GEORGE MUNGER, OF NEW HAVEN, CONNECTICUT.

IMPROVEMENT IN SCHOOL-SLATES.

Specification forming part of Letters Patent No. 26,916, dated January 24, 1860.

*To all whom it may concern:*

Be it known that we, GEORGE N. MUNGER and GEORGE MUNGER, both of New Haven, in the county of New Haven and State of Connecticut, have invented a new and useful Improvement in School-Slates or Writing-Tablets; and we do hereby declare that the following is a full, clear, and exact description thereof, reference being had to the accompanying drawings, forming a part of this specification, in which—

Figure 1 represents a slate with the ordinary frame provided with india-rubber projections. Fig. 2 is an end view of Fig. 1, showing the rubber projections inserted through the frame. Fig. 3 is a frameless slate with the projections placed round its edges for effecting the same object as in Figs. 1 and 2. Fig. 4 is an end view of Fig. 3. Fig. 5 is a face or front view of a frameless slate, in which cords are inserted through perforations made round the slate. This figure is a modification of the principle shown by Figs. 1, 2, 3, and 4. Fig. 6 is an end view of Fig. 5. Fig. 7 shows a manner of introducing the pieces of india-rubber so as to confine them in their holes.

The object of my invention is to make a noiseless school-slate and one which will not be liable to scratch the table or desks upon which it may be placed, nor be scratched itself by a contact of its surface with the surface of the desk, and to make a slate which will not be liable to slip or slide off on the floor from the inclined surfaces of the desks.

My invention for effecting the above objects consists in applying to the ordinary wooden frame school-slate or to slates without frames or to any description of writing-tablets a piece or pieces of india-rubber, cord, cork, or other suitable material, so that said material will project from the surface of the slate or from the frame thereof in such a manner that when the slate is placed on any plane surface the india-rubber—if india-rubber be used—will rest upon this surface instead of the frame or face of the slate, and the slate will thus be rendered comparatively noiseless.

In order that those skilled in the art may fully understand our invention, we will proceed to describe its construction and use.

The ordinary slate-frames, after they have been secured to the slate or previous to securing them, have perforations made through them at the corners and at intermediate points along the frame as near the edge of it as found practicable. These holes may be countersunk or made tapering from each side, as shown clearly by Fig. 7. We now introduce through the holes thus made small cylinders or plugs of india-rubber *a* of sufficient length to protect from each side of the frame about the eighth of an inch, so that the surface of the frame will not come in contact with that of the plane on which it is placed. These plugs are to be secured in their holes so that they cannot be readily picked out. Instead of perforating the frame and securing the rubber in this way, cork or other suitable material in short pieces or strips may be glued to each side of the frame so as to effect the same object; or, where frames are not used, the same end may be accomplished by perforating the edges of the slate where they are made of wood covered with a composition and passing a cord *b* of suitable thickness alternately through these holes, as shown by Figs. 5 and 6 in the drawings. In this case the ends of the cord may be brought together at the top of the slate and a loop formed, which will serve as a convenient handle. Again, where slates are made which require no frame around them the plugs or bits of india-rubber may be secured to their edges in the same manner as described for framed slates. In such slates my invention will be found especially useful and important, for their faces have no protection and the slates are soon scratched and injured, so as to render them useless.

Having thus described our invention, what we claim, and desire to secure by Letters Patent, is—

Protecting the surfaces of slates by the use of india-rubber, cord, or other suitable material applied to the frame or to the edge of a frameless slate, substantially in the manner herein described.

GEO. N. MUNGER.
GEORGE MUNGER.

Witnesses:
JAMES E. P. DEAN,
GEO. R. SHEPHERD.